United States Patent [19]

Cowell

[11] 3,784,877

[45] Jan. 8, 1974

[54] RF POWER TRANSISTOR SECONDARY BREAKDOWN PROTECTION CIRCUIT

[75] Inventor: David Cowell, Webster, N.Y.

[73] Assignee: Sybron Corporation, Rochester, N.Y.

[22] Filed: June 5, 1972

[21] Appl. No.: 259,564

[52] U.S. Cl. ........................ 317/33 R, 323/9, 323/20

[51] Int. Cl. ............................................ H02h 7/20

[58] Field of Search .................. 323/9, 20; 317/33 R

[56] References Cited

UNITED STATES PATENTS

| | | | |
|---|---|---|---|
| 3,356,930 | 12/1967 | Lupoli et al. | 323/20 |
| 3,507,096 | 4/1970 | Hall et al. | 323/20 |

*Primary Examiner*—James D. Trammell

*Attorney*—Theodore B. Roessel

[57] ABSTRACT

A protection circuit for RF power transistors to prevent secondary breakdown includes gate means to monitor both the collector current and collector voltage. A gate pulse generated each time the collector voltage exceeds a preset value is used to gate a wave form derived from the transistor collector current. When the current wave form is in phase with the gate pulse and is of sufficient amplitude, the gate means provides a controlled voltage to bias off the transistor power supply for purposes of reducing the output power to safe operating levels.

10 Claims, 4 Drawing Figures

RF POWER TRANSISTOR SECONDARY BREAKDOWN PROTECTION CIRCUIT

BACKGROUND OF THE INVENTION

The present invention relates generally to transistor protection circuits, and more specifically to a protection circuit for the prevention of secondary breakdown in RF power transistors subjected to rapidly changing reactive loads. Such loads are encountered in power amplifiers when the output load is either open or short circuited.

Secondary breakdown of RF power transistors due to rapidly changing reactive loads is encountered most frequently in electro-surgery. Electrosurgery units are usually high-powered RF amplifiers operating Class C and typically producing, for example, 300 w. of power at about 1.75 MHz. When using electrosurgical apparatus, a patient is placed on a patient plate connected to ground. The electrosurgical electrodes are then placed in contact with the patient and energized to perform the surgical or cauterization procedure. Some surgeons in order to see if the apparatus is "on" and operating properly, will energize the apparatus and briefly touch the electrode to the patient plate. If the electrodes spark, the surgeon knows the apparatus is working. However, the brief touching of the activated electrode to the patient plate produces an open and then a short circuit.

The dynamic load line of a resistively loaded transistor, operating class C, is shown in FIG. 1. As shown, the manufacturer will usually indicate the maximum possible operating conditions related to voltage and current. However, if the voltage and current result in a plot outside these limits, the transistor will probably fail due to either over-dissipation or secondary breakdown.

The load line of a class C amplifier results from the point of maximum voltage, B, occurring at a minimum current level and the point of maximum current, A, occurring at a minimum voltage level. In this way, high efficiencies are obtained.

It will be appreciated that in normal resistive loading, when the load line follows the A-B curve, various power detecting and limiting means can be used to keep the transistor operating in the safe region. However, as set out above, in high power RF application, when the output load is either open or short circuited, a rapidly changing reactive load is created.

The load line for reactive loading deviates from the closed A-B curve as shown in FIG. 2, a portion of the curve passing through the region of secondary breakdown. During the period of a short circuit the reactive loading is also in a region of secondary breakdown. The usual automatic power control means for resistive loading are either too limiting, i.e. they reduce the safe area to impractical limits for electrosurgical purposes, or they simply do not function properly during reactive loading when the load is in the area of secondary breakdown.

In the present invention, means are provided for simultaneously monitoring the voltage and collector current of the RF power transistor in order to bias off the power supply supplying voltage to the output stage collector to reduce the output power to safe operating levels whenever operation in the region of secondary breakdown is threatened.

SUMMARY OF THE INVENTION

The present invention can be characterized in one aspect thereof, by the provision of detectors to simultaneously monitor the voltage and collector current of the power transistor in the RF power output circuit. The collector voltage monitor produces a gate pulse whenever a preset voltage is exceeded, the gate pulse being used to gate a wave form derived from the collector current of the power output transistor. A transmission gate receiving both the gate pulse and the current wave form produces a control voltage whenever the wave form is in phase with the gate pulse and is of sufficient amplitude, the control voltage being applied to bias off the power supply supplying voltage to the output stage collector.

OBJECTS OF THE INVENTION

One object of the present invention is to provide means for preventing the breakdown of RF power transistors subjected to rapidly changing reactive loads.

Another object is to provide a protection circuit for RF power transistors used in electrosurgical units.

A further object of the present invention is to provide a protection circuit for the RF power transistor in electrosurgical units which monitors both the voltage and collector current of the RF transistor and biases off the power supply when preset voltages and current are exceeded.

Still another object of the present invention is to provide a protection circuit for electrosurgical units which insures the safe, trouble-free, operation of the RF power transistor in the unit.

These and other objects, advantages and characterizing features of the present invention will become more apparent upon consideration of the detailed description thereof, taken in connection with the accompanying drawings.

DESCRIPTION OF THE PREFERRED EMBODIMENTS

Figure 3:
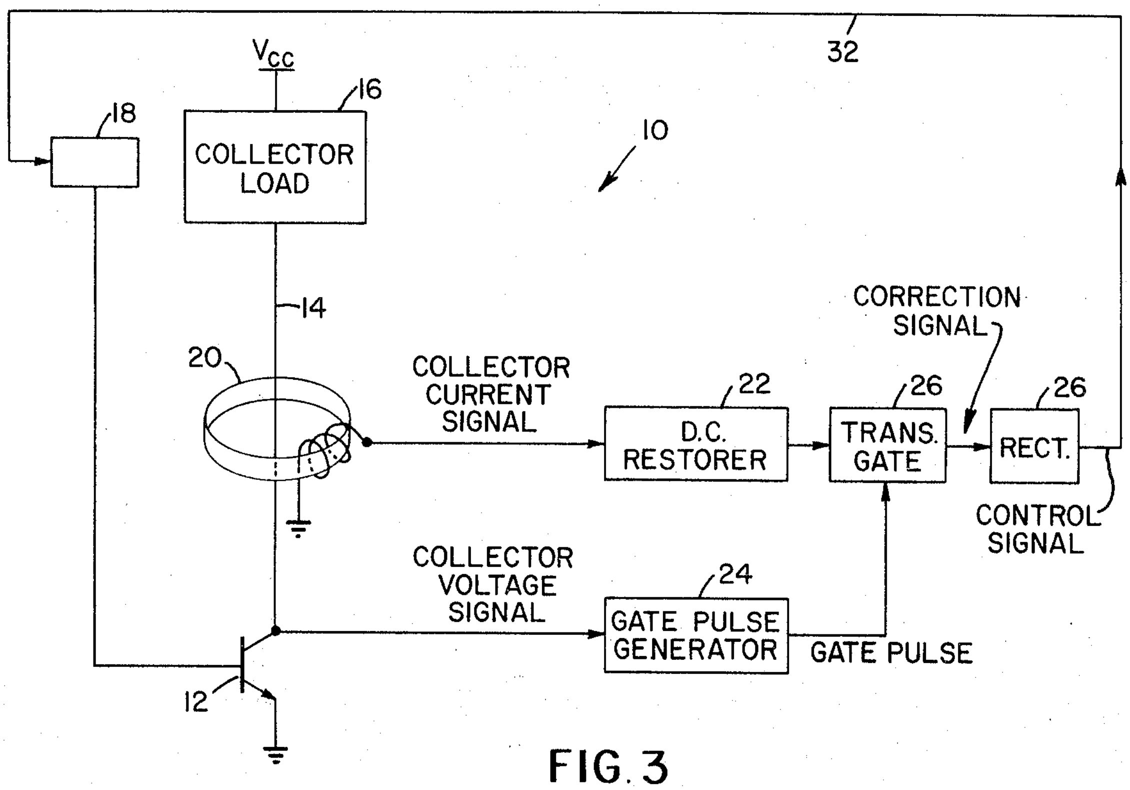
FIG. 3 is a block diagram of the protection circuit of the present invention.

Referring to the drawings, FIG. 3 shows the block diagram of the protection circuit of the present invention generally indicated at 10. This circuit is provided for purposes of preventing the failure of an RF power output transistor 12 during periods of reactive loading. Output transistor 12 has its collector connected by line 14 to a collector load 16. It should be appreciated that for electrosurgical applications, collector load 16 represents the patient and the active electrode cables and the patient plate. Connected to the base of output transistor 12 is an RF generator or exciter 18. In electrosurgery, such a transistor operates as a Class C amplifier.

As stated hereinabove, when the collector load is short circuited or is an open circuit, the resulting reactive loading may throw the operation of transistor 12 into the area of secondary breakdown, unless the output power of the exciter 18 is reduced. To reduce the output power of exciter 18 the present invention provides an appropriate collector current monitor such as a torus 20. The output of torus 20 is a voltage representative of the collector current. This voltage signal is then fed to a DC restorer 22. In the DC restorer the entire wave form derived from the torus is made positive going as shown in solid line in FIG. 4 *c*.

In addition to monitoring the collector current, the collector voltage (FIG. 4 *a*) of output transistor 12 is monitored by a gate pulse generator 24. The gate pulse generator is set up to produce a gate pulse, each time the collector voltage exceeds a preset voltage, as shown, for example, in FIGS. 4*a* and 4*b*.

Both the collector current wave form from DC restorer 22 and the gate pulse from pulse generator 24 are fed to a transmission gate 26. Whenever the current wave form occurs in phase with the gate pulse, and/or is of sufficient amplitude, the transmission gate gates the collector current wave form as shown in FIG. 4d. The gated collector current wave form from transmission gate 26 is a pulsating AC correction signal. This correction signal is fed to a rectifier 28 which in turn produces a DC control or feedback signal in the form of a control voltage. The control signal is then fed through line 32 to the RF generator 18 to bias off the power supply supplying voltage to the RF generator and reduce the power output to a safe operating level.

Figure 1:
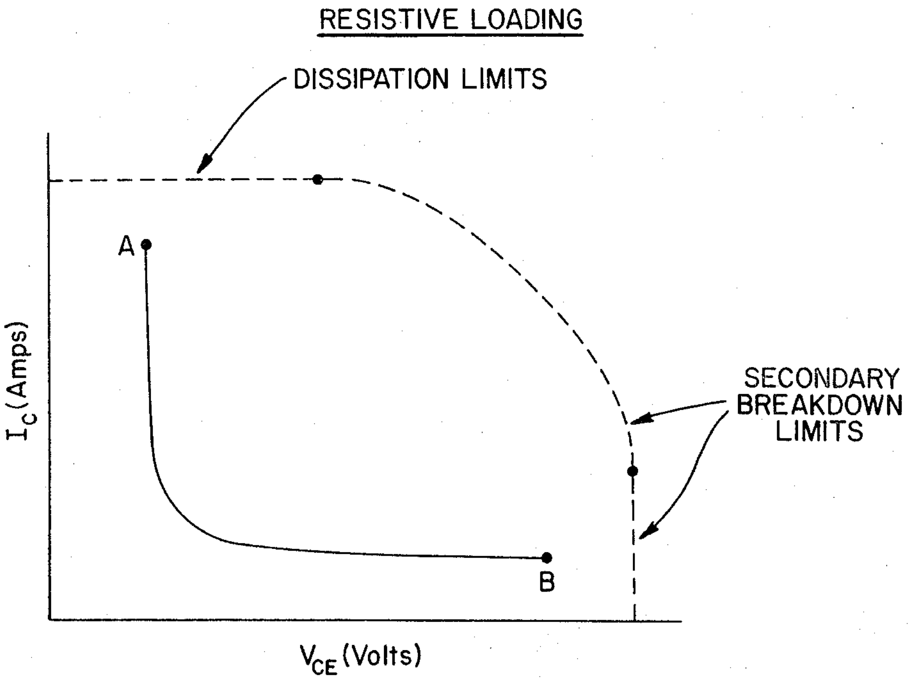
FIG. 1 is a graph showing a typical load line for a transistor under normal resistive loading.
Figure 2:
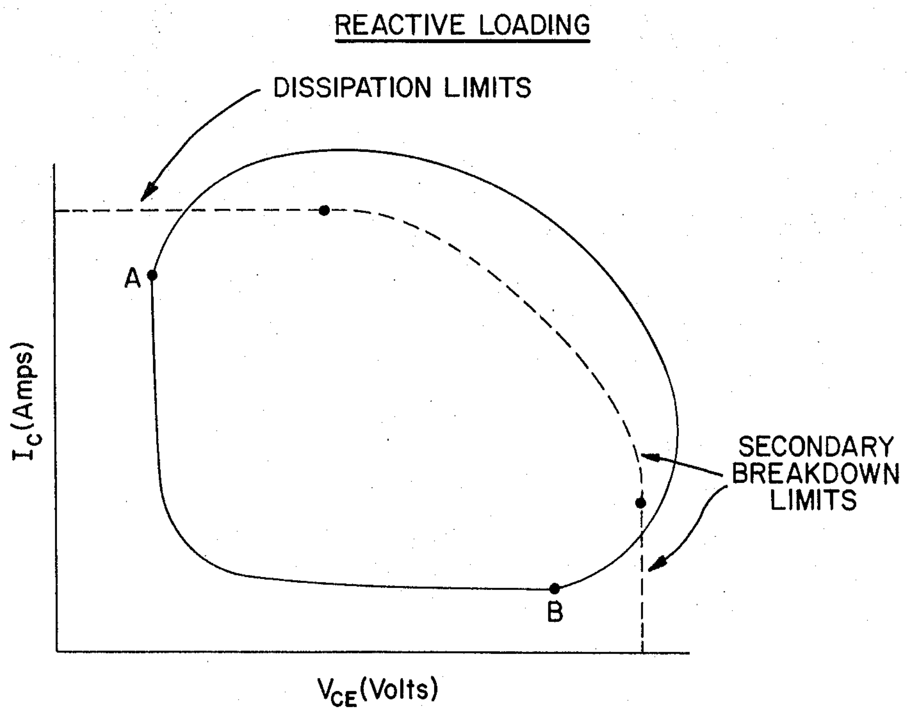
FIG. 2 is a graph similar to FIG. 1 showing a load line during periods of reactive loading.
Figure 4:
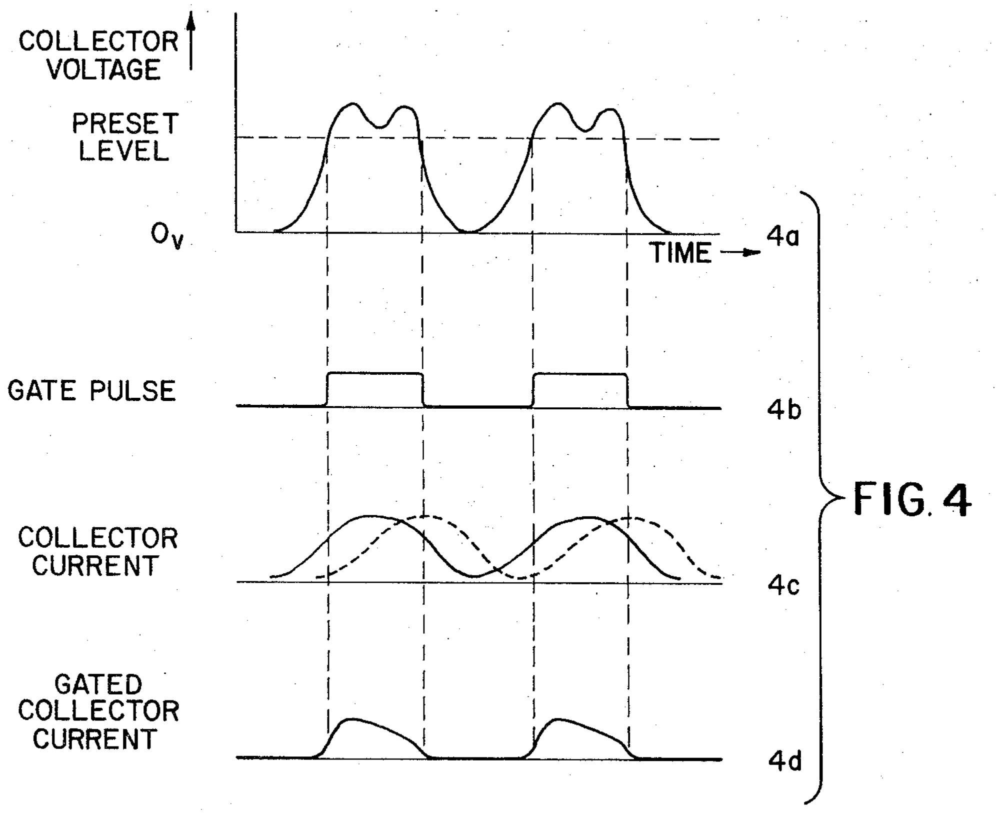
FIG. 4 *a – d* is a series of graphs showing the various wave forms produced by the protection circuit.

As set out hereinabove, transmission gate 26 will produce a correction signal when the current wave form occurs in phase with the gate pulse and is of sufficient amplitude (FIGS. 4*b* and 4*c*). However, on reference to FIGS. 4 *b* and *c*, it should be appreciated that a correction signal will also be produced if the current wave form is not exactly in phase with the gate pulse but is of sufficient amplitude. Such a wave form is shown in dotted line in FIG. 4*c*. There will be no control signal produced when the current wave form is not of sufficient amplitude or is out of phase with the gate pulse. Referring to FIG. 1, for example, it should be appreciated that if the current and voltage are out of phase, i.e. if the peak voltage appears at a low point in the current wave form, or if the peak current occurs at a low point of voltage, there will be no need to produce a correction signal because the transistor would not be operating in the area of secondary breakdown.

Thus, it should be appreciated that the present invention accomplishes its intended objects in providing a protection circuit for the RF power output transistor of an electrosurgical unit to prevent failure of the output transistor during conditions of reactive loading, i.e., when both the current and voltage are of sufficient magnitude to put the operation of the transistor into the area of secondary breakdown.

Having thus described the invention in detail, what is claimed as new is:

1. In an RF generator including a RF power output transistor, a protection circuit for preventing secondary breakdown of said transistor conprising a. means for producing a gate pulse in phase with the collector voltage of said power transistor each time the collector voltage of said power transistor exceeds a preselected value;

b. gate means receiving said gate pulse and a signal representing the collector current of said power transistor for producing an output signal only when said gate pulse and collector current are in phase and said collector current exceeds a preselected value; and c. means applying said output signal to said RF generator for reducing the output power thereof to a level within the safe operating limits of said transistor, whereby said transistor continues operation at a reduced level of power.

2. A protection circuit as set forth in claim 1, wherein said signal representing said power transistor collector current is a voltage signal.

3. A protection circuit as set forth in claim 2 including a torus operatively connected to the collector circuit of said power transistor for generating said voltage signal.

4. A protection circuit as set forth in claim 2 including a DC restorer for making said voltage signal positive going prior to feeding the same to said gate means.

5. A protection circuit as set forth in claim 1 wherein said output signal is pulsating AC, and said last mentioned means includes a rectifier for converting said pulsating AC output signal to DC.

6. A protection circuit as set forth in claim 1, wherein said RF generator operates as a Class C amplifier.

7. A protection circuit for use in an electrosurgical unit to prevent secondary breakdown during periods of reactive loading of a RF power output transistor used in said unit, said power output transistor having its base connected to the RF generator of the electrosurgical unit, said protection circuit comprising:

a. collector current monitoring means for producing a current signal representative of the collector current of said power transistor;

b. collector voltage monitoring means for producing a gate pulse in phase with the collector voltage when the collector voltage of said power transistor exceeds a preselected value;

c. a transmission gate receiving said gate pulse and current signal and producing a correction signal only when said gate pulse and current signal are in phase and said current signal exceeds a preselected value; and d. means for applying said correction signal to said RF generator to bias off the drive thereof and reduce the power supplied to said power output transistor to within the safe operating limits of said transistor.

8. A protection circuit as set forth in claim 7 wherein said collector current monitoring means is a torus which produces a voltage signal representative of said collector current.

9. A protection circuit as set forth in claim 8 including a DC restorer for making said voltage signal positive going prior to feeding said voltage signal to said transmission gate.

10. A protection circuit as set forth in claim 7 wherein said correction signal is pulsating AC and said last mentioned means includes a rectifier for converting said pulsating AC to a DC control signal, said DC control signal being applied to the power supply of said RF generator.

* * * * *